Jan. 12, 1943.  R. D. BEAN ET AL  2,307,912

MEASURING INSTRUMENT

Filed Jan. 19, 1939

INVENTOR
ROSCOE D. BEAN
COLEMAN B. MOORE
BY   FREDERICK W. SIDE

ATTORNEY

Patented Jan. 12, 1943

2,307,912

UNITED STATES PATENT OFFICE 2,307,912

MEASURING INSTRUMENT

Roscoe D. Bean, Ambler, Coleman B. Moore, Carroll Park, and Frederick W. Side, Philadelphia, Pa., assignors to The Brown Instrument Company, Philadelphia, Pa., a corporation of Pennsylvania Application January 19, 1939, Serial No. 251,688

18 Claims. (Cl. 234—72)

The present invention relates to recording instruments and more particularly to a means for supporting a chart in recording position in an instrument. The invention also relates to an indicating means to be used in conjunction with the recording pen to indicate at a distance the value of the condition being recorded on the chart by the pen.

It is an object of our invention to provide a chart hub upon which a record receiving chart may be placed. The hub is frictionally driven from some suitable constant speed drive means to rotate the chart, but because of the frictional drive may be manually rotated at will to adjust the chart relative to the pen.

It is a further object of our invention to provide an indicating pointer adapted to cooperate with a suitable scale that is mounted concentrically with the chart hub. This pointer is so constructed that it may be moved out of the way of the chart without in any way disconnecting it from its drive and without removing it from its concentric relation to the chart.

It is a further object of our invention to provide a chart hub which may be moved axially with respect to the chart and its backing plate in order to strip the chart from the hub so that it may be more easily removed from the instrument.

The various features of novelty which characterize our invention are pointed out with particularity in the claims annexed to and forming a part of this specification. For a better understanding of the invention, however, its advantages and specific objects obtained with its use, reference should be had to the accompanying drawing and descriptive matter in which we have illustrated and described a preferred embodiment of the invention.

Figure 1:
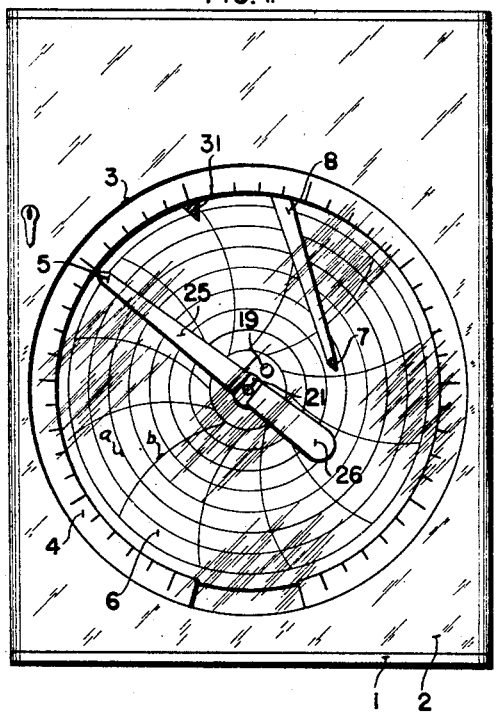
Fig. 1 is a front view of a recording instrument embodying our invention.

Referring to Fig. 1 there is shown an instrument casing 1 having a door 2 that is provided with a glass covered opening or window 3 through which may be viewed the recording pen, the chart, the indicating pointer and various other parts of the instrument. Around the edge of the opening 3 is a scale 4 with which the end of a pointer 5 cooperates to indicate the value of the condition being measured. This permits a workman to ascertain the value of the condition at a distance from the instrument.

Lying within the scale 4 and below the pointer 5 is a chart 6 which is mounted upon and rotated by a chart hub to be later described. The chart is provided with concentric lines a which are to indicate thereon magnitudes of the condition as recorded by a pen 7 moving across the chart. The chart is also provided with lines b that are concentric with the pivot point around which the pen arm 8 moves. Since the chart is rotated at a constant speed these lines b, which are equally spaced apart, serve to indicate the time at which any portion of the record was made.

Within the casing 1 and attached to the back thereof by any suitable means is a supporting plate 9 that has attached to and extending from the front thereof a hollow supporting sleeve 10. Rotatably supported within the supporting sleeve is a hollow shaft 11 which has secured to its rear end a gear 12 that is driven by gears 13 from some suitable constant speed driving means such as a clock or small synchronous motor. The shaft 11 is used to rotate the chart 6 and does so by means of a chart hub 14 which is frictionally mounted thereon. The hub 14 is provided with a sleeve portion surrounding the shaft 11 and is pressed by a spring 15 to the right in Fig. 2 against a washer or collar 16 which is fixed against displacement from the shaft by a turned up edge 17. The left end of the spring 15 presses against a washer 18 that bears against the front end of the journal 10.

Because of this construction the hub 14 normally rotates with the shaft 11, but may be turned relative thereto when necessary. To facilitate the relative movement of the hub and shaft a small knob 19 projects from the hub and may be grasped for that purpose. This knob also serves the same function as an hour hand on a clock as will be later explained.

Figure 2:
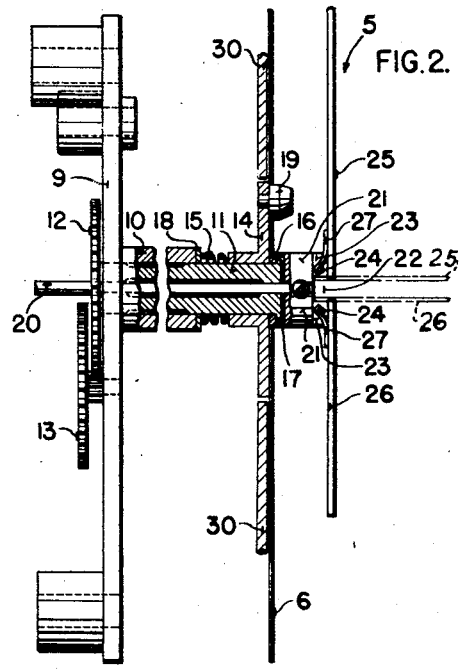
Fig. 2 is a side view, partly in section showing our chart hub and pointer.

Extending through the center of shaft 11 is a shaft 20 which has on its front end a collar 21 that has a cut 22 in its face to provide two forwardly extending projections 23. The collar 21 is undercut as shown in the drawing so that it may receive the turned up edge 17 and be held close to the washer 16. Each of the projections 23 has a pin 24 extending through it, which pins cooperate with the projections 23 to hold the indicating pointer 5. The pointer 5 is made up of two portions 25 and 26 the former of which cooperates with the scale 3 to indicate the value of the condition and the latter of which serves as a continuation of part 25. Attached to each of the parts 25 and 26 of the pointer is a pair of springs 27, each one of which is adapted to engage an end of a pin 24. The springs serve to hold the parts of the pointer against the faces of projections 23 so that they extend radially of the chart as shown in Figs. 1 and 2. The parts 25 and 26 of the pointer may, however, at times be moved to their dotted line position of Fig. 2, the springs 27 giving for this purpose. The springs then act to hold parts 25 and 26 in their dotted line positions. The shaft 20, to which the pointer is attached, is adapted to be rotated in synchronism with the pen arm by any suitable means so that the pointer will be at the same graduation mark along the scale 3 that the pen is along the chart 6.

Figure 5:
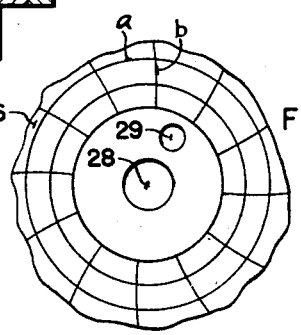
Fig. 5 is a partial view of a chart to be used with the chart hub of the invention.

A chart for use with a chart hub of the type shown at 14 is shown in Fig. 5 and is provided with a central opening 28 large enough to be snugly received by the washer 16 and an eccentrically positioned opening 29 to be received snugly by the knob 19.

When placing a chart on the chart hub the pointer members 25 and 26 are first moved to the dotted line positions of Fig. 2. The opening 28 of the chart is then slid over the parts 25 and 26 and pushed snugly against the chart hub 14 over the washer 16. The chart is now rotated until opening 29 is in line with knob 19 and then pushed against the hub 14. A backing plate 30 serves to support the remainder of the chart as it is rotated by the hub 14. If the instrument has been stopped for some time it will be necessary to rotate the chart to bring the proper time line b under the pen 7. The knob 19 is thereupon grasped and rotated to move the chart to the correct position. In order to facilitate this adjustment a pointed member 31 on the plate 30 is provided to extend out over the edge of the chart to cooperate with the time lines b so that the chart may be properly positioned. The parts 25 and 26 are now moved back to the full line position of Fig. 2 to cooperate with the scale 3. Thereafter when the instrument is in continuous operation the chart is usually changed once a day and in order to properly position it relative to the pen it is only necessary to place the opening 29 on the knob 19 instead of adjusting each chart individually as is done in the usual type of instrument. Since the knob is rotating with the hub at a constant speed, its position indicates the time of day. Therefore, if the opening 29 is made in the same place in each chart, the chart will always be correctly positioned relative to the pen when opening 29 is placed over knob 19.

Figure 3:
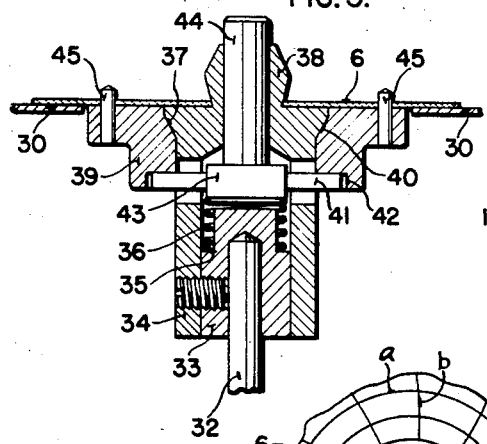
Fig. 3 is a sectional view of a modified form of chart hub.

In Fig. 3, there is shown another embodiment of the chart hub. In this case the hub is shown as being driven by a shaft 32 to one end of which is attached by a set-screw a cap 33 and a hollow member 34. The cap 33 is cut away to form a shoulder 35 which along with the interior surface of member 34 forms a guide channel and abutment for a spring 36 whose function will be later described. Toward the upper end of member 34 is formed an outwardly extending surface 37 and the end is provided with a projection 38 over which the center opening of the chart is adapted to be placed. The projection 38 is slightly larger in the center than at its ends so that the inner sloping surface will tend to cause the chart to press tightly against the end of member 34.

Cooperating with the member 34 to form a chart supporting surface on the chart hub is an annular part 39 which is provided with an inclined face 40 adapted to lie against face 37 of member 34. The faces 37 and 40 are kept in frictional engagement with each other by means of a pin 41 engaging the part 39 in an undercut portion 42. The pin 41 extends through openings in member 34 and through a block 43 that is forced upwardly by the spring 36; the block 43 also being provided with an extension 44 that projects through the part 38. In order to prevent relative rotation between the annular part 39 and the chart 6, the former is provided with a plurality of members 45 that are adapted to extend through suitable openings in the chart similar to openings 29. It is to be understood that only one projection may be provided as was the case in the embodiment of Fig. 2, if it is so desired.

With a chart hub of this type the chart is placed in position with its central opening around projection 38 and its eccentric openings around the member or members 45. If the time lines of the chart are not correctly positioned with respect to the pen the members 45 may be grasped and rotated to move part 39 relative to member 34 until the chart is correctly positioned. Thereafter members 45 will be properly positioned for a given time and it is only necessary to place the openings in the chart over the members. If it is desired to have part 39 rotate freely it is only necessary to push the extension 44 inwardly against the force of spring 36 to relieve the friction between surfaces 37 and 40.

Figure 4:
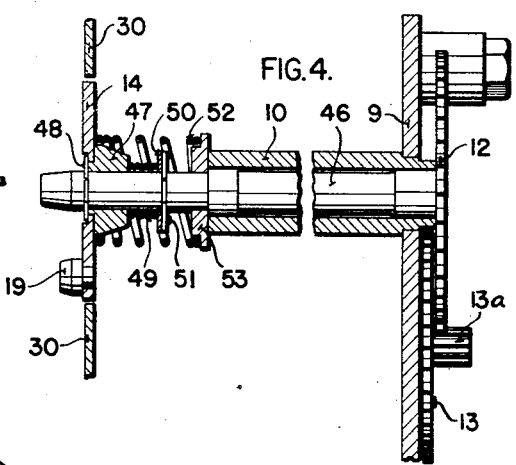
Fig. 4 is a sectional view of a still further form of chart hub.

In Fig. 4 there is shown another embodiment of the invention, the chart hub of this embodiment being provided with a chart stripping means. A sleeve 10 similar to that in Fig. 1 is attached to and projects from the supporting plate 9. Within the sleeve 10 is a shaft 46 driven by gears 12 and 13 to rotate the chart. Rotatably mounted on the shaft 46 is a hub member 47, in conjunction with adjacent elements, supporting the chart hub 14 that is provided with a knob 19 similar to that in Fig. 1. The hub 14 and hub member 47 are prevented from moving to the left by a collar 48 secured to the shaft 46, but are urged in that direction into frictional engagement with the collar by a spring 49 acting through hub member 47. This spring has its other end abutting a washer 50 that is forced into engagement with a second collar 51 on the shaft. Thus chart hub 14 is frictionally held for rotation with shaft 46, but may be rotated relative thereto by using the knob 19 as a handle, as was done in Figure 2.

In order to procure a stripping action to remove the chart from the chart hub, the hub is adapted to be moved inwardly away from the chart supporting plate 30 or to the right in Fig. 4. To this end there is provided a spring 52 bearing at one end against the back of chart hub 14 and bearing with its other end against a washer 53 loose on shaft 46, the washer being limited in its movement to the right by the end of journal 10. This construction permits spring 52 and washer 53 to rotate with shaft 46, hub 14 and the chart.

With this embodiment of the invention the chart 6 is to be placed on the chart hub just as it was in the previously described embodiments. In order to remove the chart from the chart hub the end of shaft 46 is pressed to move the shaft and the parts mounted thereon to the right in Figure 4 against the tension of spring 52. This movement causes the chart plate 30 to strip the chart off the end of shaft 46 and projection 19. Due to the snug fit of the openings in the chart on the end of shaft 46 and pin 19 the chart will not voluntarily be received by the shaft and pin when the stripping force is removed from the end of the shaft. It is noted that pinion 13a of gear 13 is made of such a length that the chart hub on its stripping movement will not cause gear 12 and pinion 13a to become disengaged.

From the above description it will be seen that we have invented a novel type of chart hub and cooperating indicator. The hub permits a chart to be easily placed on and removed therefrom and insures that the chart is properly positioned angularly with respect to the pen. The hub also permits of an easy angular adjustment of the chart. The pointer, in its position concentric with the chart, gives from a distance a legible indication of the value of the condition. This is the logical place to mount a pointer but difficulties of manufacture have heretofore limited its use because of the fact that wires, gearing and levers have been extended across from the edge of the chart to the pointer. This mechanism then needed to be removed each time the chart was changed. By the use of a pointer, constructed as shown in the application, it is possible to mount a pointer concentric with the chart and still leave the pointer in its adjusted position while the chart is being changed. The unique cooperation of the pointer, its drive shaft and the chart hub permit an economical, logical and highly efficient arrangement of parts that supplies a long felt need in the art.

While in accordance with the provisions of the statutes, we have illustrated and described the best form of our invention now known to us, it will be apparent to those skilled in the art that changes may be made in the form of the apparatus disclosed without departing from the spirit of our invention as set forth in the appended claims, and that in some cases certain features of our invention may sometimes be used to advantage without a corresponding use of other features.

Having now described our invention, what we claim as new and desire to secure by Letters Patent is:

1. In a measuring instrument the combination of a chart backing plate having an opening therein, a chart hub extending through said opening, a drive shaft for said chart hub, an indicating pointer in front of said chart hub, a drive shaft for said pointer concentric with the drive shaft for said chart hub, and pivotal means mounting said pointer on its drive shaft whereby said pointer may be collapsed to a position parallel to its shaft so that a chart may be slid over said pointer for placement on said hub.

2. In a measuring instrument the combination with a sleeve, a support therefor, a tubular shaft rotatable in said sleeve, a chart hub mounted on said shaft and adapted to support a chart for rotation therewith, a second shaft extending through said tubular shaft, an indicating pointer thereon in front of said hub and parallel to the hub, and means mounting said pointer on said second shaft for movement from its parallel position to a position perpendicular to said hub whereby a chart may be passed over said pointer to be placed on said hub.

3. In a combination with a measuring instrument having a chart upon which a record is to be made and a recording pen adapted to make a record on the chart, means to support and rotate the chart past said pen, a folding pointer to indicate the value of the record being made by the pen and normally extending parallel to the chart, and means to mount said pointer concentric with and in front of the chart, said pointer in its folded position extending perpendicular to the chart, the chart being adapted to be slid over said pointer when the latter is in its folded position so the chart can be placed on its supporting means.

4. In a measuring instrument having a chart and a pen adapted to make a record upon the chart, the combination of a hub upon which the chart is supported, a driven shaft having an abutment thereupon upon which said hub is mounted, a stationary bearing for said driven shaft, resilient means between said bearing and hub forcing said hub into engagement with said abutment whereby said hub is frictionally restrained for rotation with said shaft, and a knob on said hub in eccentric relation therewith whereby upon rotation of said knob the chart on said hub will be moved relative to said pen.

5. In a measuring instrument a supporting plate, a sleeve projecting therefrom, a shaft rotatable in said sleeve and having an abutment thereon, a chart hub mounted for rotation on said shaft back of said abutment, means to force said hub into frictional engagement with said abutment and means mounted in eccentric relation on said hub to facilitate movement of said hub relative to said shaft.

6. In a measuring instrument the combination with a chart hub having a knob eccentrically positioned thereon, a driven shaft upon which said hub is concentrically mounted, and means to provide a frictional drive connection between said hub and shaft, said chart hub being adapted to receive a chart provided with a concentric and an eccentric opening adapted to be placed respectively over said shaft and knob.

7. In a measuring instrument a chart backing plate, a chart hub extending through said plate, an axially movable supporting shaft for said chart hub, and resilient means to hold said shaft and hub in a normal position in which they extend through said plate.

8. In a measuring instrument a chart backing plate having an opening therein, an axially movable shaft projecting through said opening, a chart hub mounted for rotation on said shaft, means to normally prevent relative rotation of said hub and shaft, and resilient means to hold said chart hub and shaft in a normal position with said hub aligned with the opening in said plate.

9. In a measuring instrument the combination with a chart backing plate provided with an opening therein, a slidable shaft projecting through said opening in its normal position, a chart hub frictionally mounted on said shaft, resilient means urging said shaft and hub toward their normal positions, said shaft and hub being adapted to be moved toward the rear of said backing plate against the force of said resilient means to strip from said hub a chart mounted thereon.

10. In a measuring instrument, a chart supporting member, a shaft extending therethrough, a collar mounted on said shaft in front of said member, and a plurality of parts individually movable on said collar cooperating to form a pointer, the pointer extending parallel to said member.

11. In a measuring instrument, a chart supporting member, a shaft extending therethrough, an enlargement on said shaft, a pointer member, means to at all times pivotally support said pointer member on said enlargement whereby it may be placed parallel to or perpendicular to said supporting member.

12. In combination with a measuring instrument a casing having a door with a window therein and having a chart mounted back of said window, a scale surrounding said window, a pointer within said casing between the chart and window and parallel to them cooperating with said scale to indicate the value of a condition, separate means mounting the chart and pointer for rotation around the same axis, and means mounting said pointer on its supporting means for movement from its position parallel to the chart to a position perpendicular to its axis whereby said chart may be moved over said pointer into position.

13. In a measuring instrument the combination of a chart backing plate having an opening therein, a chart hub extending through said opening, a hollow drive shaft for said chart hub, an indicating pointer in front of said chart hub, and a drive shaft for said pointer extending through the drive shaft for the chart hub, said pointer comprising a part pivoted for movement from a position parallel to said chart hub to a position perpendicular thereto, whereby a chart may be slid over said pointer onto the chart hub.

14. In a measuring instrument having a chart backing plate with an opening therein, a shaft extending through said opening, an abutment on said shaft, a chart hub free on said shaft and behind said abutment, and resilient means to force said hub against said abutment whereby the chart hub is frictionally connected to said shaft.

15. In a measuring instrument the combination of a chart backing plate having a circular opening therein, a driven shaft extending through said opening and concentric therewith, a chart hub rotatably mounted on said shaft and aligned with said backing plate, an abutment on said shaft in front of said chart hub and resilient means back of said chart hub forcing the same into engagement with said abutment whereby said chart hub is frictionally held to rotate with said driven shaft.

16. In a measuring instrument, the combination of a chart backing plate having an opening therein, a bearing located back of said plate, a tubular shaft extending through said opening and mounted for rotation in said bearing, a chart hub, means for frictionally mounting said chart hub on said tubular shaft with the hub aligned with said opening, a second shaft extending through said tubular shaft and mounted therein for rotation relative thereto, and an indicating pointer mounted on said shaft in front of said chart hub.

17. In a measuring instrument having provisions to both record and indicate the value of a condition, the combination of a tubular bearing, a tubular shaft mounted for rotation in said bearing, a chart hub adapted to receive a recording chart, means for frictionally mounting said chart hub on said tubular shaft for rotation therewith and relative thereto, a shaft extending through and journaled for rotation in said tubular shaft, and an indicating pointer mounted for rotation with said shaft and relative to a chart mounted on said chart hub.

18. In a measuring instrument, the combination of a chart backing plate having an opening therein, a bearing located back of said plate, a tubular shaft extending through said opening and mounted for rotation in said bearing, an abutment on said shaft, a chart hub free on said shaft behind said abutment, resilient means to force said hub against said abutment whereby said chart hub is frictionally connected to said shaft, a second shaft extending through said tubular shaft and mounted therein for rotation relative thereto, and an indicating pointer mounted on said shaft in front of said chart hub.

ROSCOE D. BEAN.
COLEMAN B. MOORE.
FREDERICK W. SIDE.